3,144,427
POLYHYDRIC ALCOHOL DISPERSION OF A CHLOROPRENE POLYMER AND PROCESS OF PREPARING SAME
Donald Clark Thompson, Wilmington, Del., assignor to E. I. du Pont de Nemours and Company, Wilmington, Del., a corporation of Delaware
No Drawing. Filed Apr. 4, 1960, Ser. No. 19,441
1 Claim. (Cl. 260—33.4)

This invention is directed to chloroprene polymers and more particularly to their latex-like dispersions in polyhydric alcohols and to the preparation of such dispersions and to their use in modifying the properties of asphalt.

Dispersions of the rubber-like polymers of chloroprene in polyhydric alcohols such as glycerol have certain practical uses and may be made according to U.S. Patent 2,080,558 by dispersing the monomeric chloroprene in glycerine and polymerizing. This process has practical disadvantages. First, the dispersions, particularly at intermediate stages in the polymerization, are very viscous and the problem of agitation connected with removing the heat of polymerization, which is troublesome even in aqueous dispersions, becomes serious. Furthermore, the non-aqueous systems are more limited than the aqueous systems as to the dispersing agents, and agents for the initiation and control of the polymerization which may be used. Thus U.S. Patent 2,080,588 suggests that water be used to bring about the solution of such agents in the glycerine. The presence of even small proportions of water is highly undesirable, however, when the dispersion is to be incorporated in hot asphalt, since even these small amounts cause foaming at the temperatures usually used. Accordingly, it is desired to prepare dispersions of chloroprene polymer in liquid anhydrous polyhydric alcohols by a more convenient and generally applicable method.

It is therefore an object of the present invention to provide a polyhydric alcohol dispersion of chloroprene polymer made in the presence of an alkyl mercaptan, said dispersion being non-aqueous. It is a further object of this invention to provide a non-aqueous latex-like dispersion of rubber-like chloroprene polymer by adding a liquid polyhydric alcohol to an aqueous chloroprene polymer latex followed by substantially completely evaporating the water.

More specifically, the present invention is directed to the preparation of a non-aqueous latex-like dispersion of rubber-like chloropene polymer by adding a liquid polyhydric alcohol to an aqueous chloroprene polymer latex and substantially completely evaporating the water.

This invention also encompasses, in a preferred embodiment, a polyhydric alcohol dispersion of chloroprene polymer made in the presence of an alkyl mercaptan, said dispersion being non-aqueous. These and other objects will become apparent in the following description and claims.

This invention is applicable to any rubber-like chloroprene polymer that may be made by polymerizing chloroprene in aqueous emulsion and may be of either the plastic, benzene-soluble or the elastic type which is only swollen by benzene. For preparing such latices, see for example U.S. Patents 1,967,861; 2,138,226; 2,227,517; 2,264,173; and 2,567,117. When the polymers are ultimately to be incorporated in asphalt, those preferred are of the plastic, soluble type, made by polymerizing in the presence of alkyl mercaptans of 8 to 18 carbon atoms. One method for making these is shown in the last of the heretofore-cited patents wherein the amount of mercaptan recommended ranges from 0.1% to 2% of the weight of the chloroprene. "Chloroprene polymer" as used herein includes copolymers of chloroprene with lesser amounts of other monomers such as styrene, acrylonitrile, and 2,3-dichlorobutadiene.

The liquid polyhydric alcohol, used to form the final latex, should ordinarily contain not more than four carbon atoms. These compounds are completely miscible with water and are stable at the temperatures at which the water can be completely removed. Examples are ethylene glycol, tetramethylene glycol, and glycerine. The amount of polyhydric alcohol utilized according to the present invention will be that amount chosen so that the final amount thereof in the dispersion will be between about 40 to about 80% by weight of the total dispersion.

The water is preferably evaporated by boiling at reduced pressure, either in a conventional still or in various special types of film evaporators. Some form of agitation is of course useful in all cases. Particularly when the chloroprene polymer dispersion is to be incorporated in molten asphalt, the water should be reduced below 1% of the latex.

The following representative example illustrates the present invention; substitution of the equivalent chloroprene polymer copolymers and liquid polyhydric alcohols may be made in this example to achieve substantially the same results.

*Example*

An aqueous dispersion of polychloroprene, said polychloroprene being substantially soluble in benzene, is first prepared by dissolving 4 parts by weight of disproportionated rosin and 0.25 part of dodecyl mercaptan in 100 parts of chloroprene, dispersing this in 150 parts of water containing 0.9 part of sodium hydroxide and carrying out the polymerization by adding a water solution of ammonium persulfate. When 70% of the chloroprene has been polymerized, further polymerization is short-stopped by adding an aqueous dispersion of 0.05 part each of tertiary butyl catechol and of phenothiazine. Unpolymerized chloroprene and part of the water is then removed by stripping with steam in an externally heated turbannular flow tube by the method of U.S. Patent 2,467,769.

The resulting latex containing 37.5% solids is mixed with 125 parts of glycerol and the mixture is then kept at 25° C. and distilled at reduced pressure, with stirring to control foaming, until 125 parts of water have been removed. The pressure at the end is 5 mm. A stable latex containing about 37% of polychloroprene results.

This latex is readily incorporated in molten asphalt by stirring, without the foaming which is an inconvenience in incorporating aqueous latices. Three percent of polychloroprene introduced into molten asphalt in the form of the glycerine latex gives substantially the same improvement in asphalt properties, such as toughness, tenacity, and low temperature ductility, as is given by the same amount of a similar polychloroprene incorporated from aqueous latex.

In the preceding example, copolymers of chloroprene with lesser amounts of styrene, acrylonitrile and 2,3-dichlorobutadiene, as well as any of the liquid polyhydric alcohols, such as ethylene glycol, tetramethylene glycol and glycerine may be substituted in the preceding example to give substantially the same results.

As a matter of preference, the Mooney viscosity of the isolated polymers utilized according to the present invention will be between 40 and 50 as determined by ASTM D-927-55-T.

As many apparently widely different embodiments of this invention may be made without departing from the spirit and scope thereof, it is to be understood that this invention is not limited to the specific embodiments thereof except as defined in the appended claim.

The embodiments of the invention in which an exclusive property or privilege is claimed are defined as follows.

I claim:

A process for preparing a non-aqueous, latex-like dispersion of a plastic, benzene-soluble chloroprene polymer in a liquid polyhydric alcohol of not more than four carbon atoms, which process comprises polymerizing chloroprene in an alkaline aqueous dispersion in the presence of from 0.1 to 2%, by weight of said chloroprene, of an alkyl mercaptan containing from 8 to 18 carbon atoms, followed by adding said alcohol to said aqueous dispersion in an amount chosen so that the final amount thereof in the dispersion will be between about 40 to about 80% by weight of the total dispersion and then substantially completely evaporating water.

References Cited in the file of this patent

UNITED STATES PATENTS

| | | |
|---|---|---|
| 2,080,558 | Carothers | May 18, 1937 |
| 2,281,613 | Wolltham et al. | May 5, 1942 |
| 2,537,908 | Pechukas | Jan. 9, 1951 |
| 2,567,117 | Mochel | Sept. 4, 1951 |
| 2,683,129 | Bratton et al. | July 6, 1954 |